June 3, 1930. G. H. KNIGHT 1,762,062
UNIT CONSTRUCTION AND TWO-SPEED DRIVING GEAR
ARRANGEMENT FOR CRANK SHAPING MACHINES
Filed July 14, 1926 2 Sheets-Sheet 1

Inventor
George H. Knight
By Attorneys
Southgate Fay & Horsley

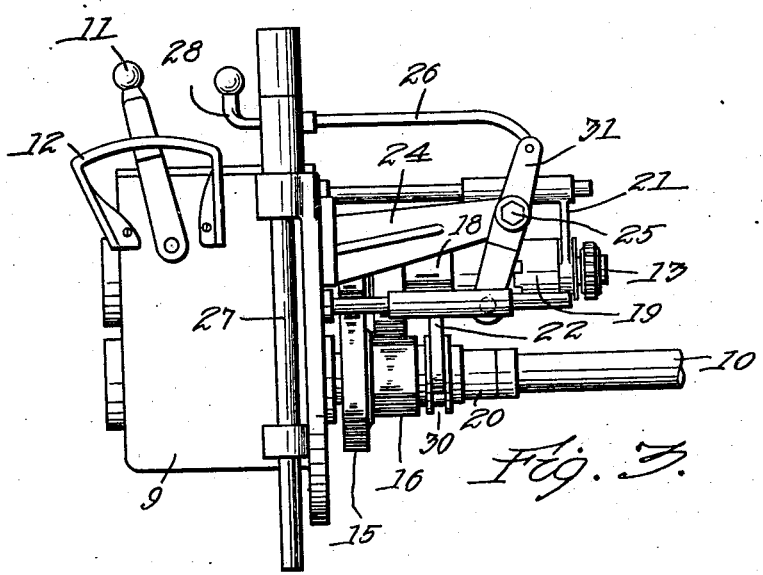

Patented June 3, 1930

1,762,062

UNITED STATES PATENT OFFICE

GEORGE H. KNIGHT, OF TORRINGTON, CONNECTICUT, ASSIGNOR TO THE HENDEY MACHINE COMPANY, OF TORRINGTON, CONNECTICUT, A CORPORATION OF CONNECTICUT

UNIT CONSTRUCTION AND TWO-SPEED DRIVING-GEAR ARRANGEMENT FOR CRANK-SHAPING MACHINES

Application filed July 14, 1926. Serial No. 122,456.

This invention relates to a two speed gear drive for the bull gear of a crank shaper or other machine driven in that manner, and to a unit construction therefor. The principal objects of the invention are to provide a construction in which the arrangement of parts is very simple and compact; in which all the gears, clutches, forks and the like can be spaced and adjusted on the bench or assembly stand before being assembled with the rest of the machine; in which only two shafts are employed to get all the speed changes that are usually provided for such machines and to construct this all in one unit which, as stated, can be assembled separately and then applied to the machine; and in which only two parts of the unit have to be removed before placing the gear box in position on the base.

Other objects and advantages of the invention will appear hereinafter.

Reference is to be had to the accompanying drawings in which

Fig. 3 is a side view taken from the side opposite from that from which Fig. 2 is taken; and Fig. 4 is a plan of the gear box.

Figure 1:
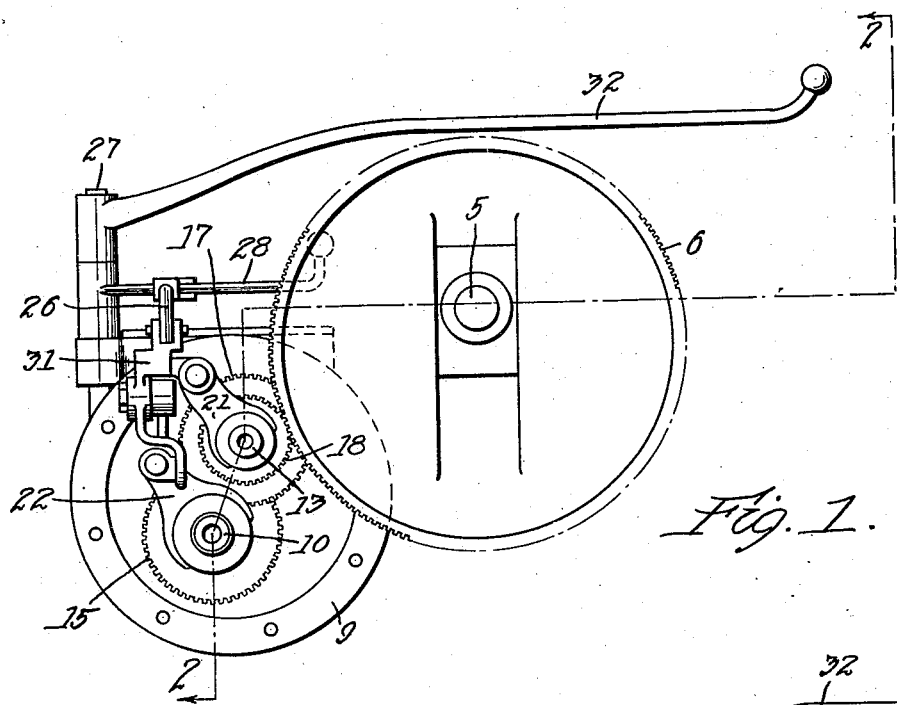
Fig. 1 is an end view of a unit which constitutes the subject of this invention with the bull gear shown in position to be driven therefrom.
Figure 2:
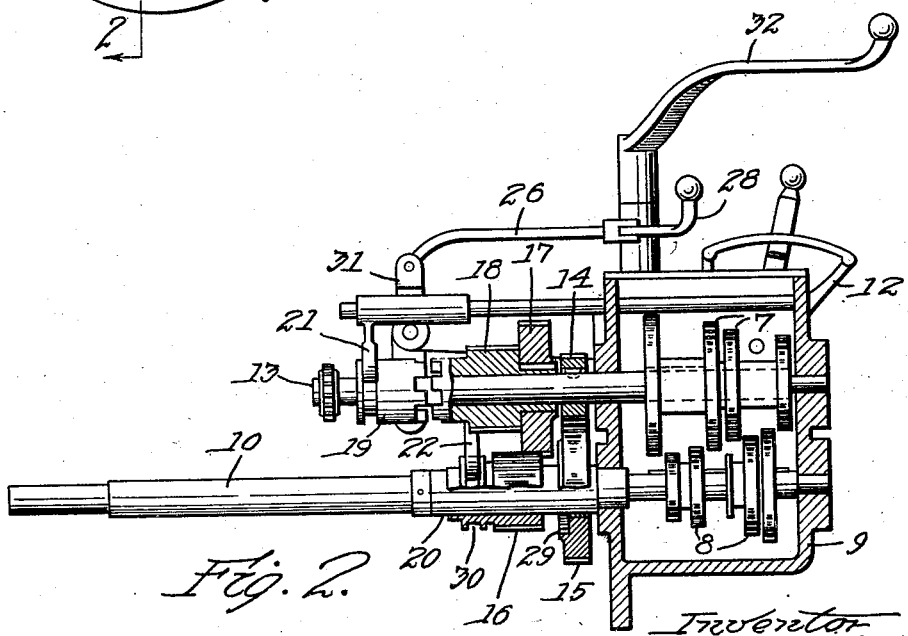
Fig. 2 is a sectional view of the unit on the line 2—2 of Fig. 1.

As stated, this invention is designed for operating the bull gear 6 which has a crank 5 for operating the machine, as a shaper or the like. The driving shaft 10 which is driven from the outer end in Fig. 2 is provided with gearing 8 which co-operates with gearing 7 of the usual construction on a shaft 13, one of the elements being slidable, and all located in the gear box 9. The sliding gears are operated by a lever 11 guided in an H slot in a casting 12 so that four changes of speed are obtained inside the gear box in the usual manner. These parts are old and do not constitute a part of this invention.

The unit comprises two shafts, the shaft 10 which is the driving shaft, and a shaft 13 both extending into the change speed gear box. The shaft 13 carries a pinion 14 keyed fast to it and a clutch 19 also keyed but slidable. Running loose on this shaft is a gear 17 and the bull pinion 18 which meshes with the bull gear 6. The gear 17 and pinion 18 are keyed together but turn loosely on the shaft 13. On the shaft 10 is a gear 15 meshing with the pinion 14. The gear 15 is fixed on a sleeve 20 which turns loosely on the shaft 10. Also mounted on the sleeve 20 is a sliding pinion 16. In one extreme position, this pinion 16 meshes with the gear 17 and also engages the internal gear clutch and rack 29 formed on the side of the gear 15. In the opposite extreme position the pinion 16 slides out of mesh with 29 and 17. It is provided with a grooved collar 30 operated as will appear. The gear 15 is provided with an internal rack 29 on its side which acts as a clutch in co-operation with the end of the pinion 16. The gear 16 and clutch 19 are operated by a lever 28 fixed on a vertical shaft 27 and connected by a rod 26 to a lever 31 and forks 21 and 22. These forks are connected by the lever 31 pivoted on a stud 25 on a fixed arm 24 so that the forks move oppositely. The shaft 27 also has a long operative handle 32.

In the operation of the device, when the clutch 19 is engaged, the pinion 16 slides over to become disconnected from the gear 17 and the four speeds of the shaft 13 can be given to the bull pinion 18 and therefore to the bull gear 6. When the lever 28 is thrown over to the other extreme position, the clutch 19 is disengaged as shown in Fig. 2 and the back gears and clutch 29 are connected. The drive is then through the gears 14, 15, 16, 17 and 18. This produces four slower speeds for the bull pinion and bull gear.

This is an extremely simple and compact arrangement of parts employing only two shafts. It forms a unit which has material advantages from a manufacturing standpoint on account of the simplicity of assembly especially. The rod 26 and lever 31 are the only parts of the unit that have to be removed before placing the gear box in position on the base. All the gears, clutches, forks, etc. can be spaced and adjusted on the bench and assembled in this unit before the unit is applied to the machine. The unit includes all the driving gear train of the shaper to the bull gear, the forks controlling the gears and clutches, the shafts on which the forks slide, and the handles and levers for making the gear shifts. All the driving gears are carried on the two shafts 10 and 13.

Although I have illustrated and described only one form of the invention, I am aware of the fact that modifications can be made therein by any person skilled in the art without departing from the scope of the invention as expressed in the claims.

Therefore, I do not wish to be limited to all the details of construction herein shown and described, but what I do claim is:—

1. In a driving gear unit for the purpose described, the combination with driving and driven shafts, intermeshing gearing all mounted on said shafts including a loose gear in the driven shaft, a gear loose on the driving shaft adapted to be moved along the driving shaft for connecting it with and disconnecting the driving shaft from said loose gear on the driven shaft, a clutch on the driven shaft for clutching the loose gear to the driven shaft, means for selectively driving the shiftable gear from said driven shaft, and means for simultaneously operating the clutch and gear shifting means, of a change speed gear box having means for changing the speed, said gearing on the two shafts constituting means for doubling the range of the change speed gearing.

2. In a driving unit for speed change gearing, the combination of a driving and driven shaft and change speed gearing, all located on said two shafts, with a driving pinion loosely mounted on the driven shaft, means for clutching the said pinion to its shaft to be driven thereby, a gear fixed with respect to the driving pinion, a pinion fixed to the driven shaft, a pinion on the driving shaft slidable into and out of mesh with said gear fixed to the driving pinion, a gear loose on the driving shaft constantly meshing with the pinion fixed to the driven shaft, an internal rack on the gear loose on the driving shaft adapted to mesh with said pinion on the driving shaft when the latter meshes with the gear fixed to the loose pinion on the driven shaft, and means for simultaneously opening the clutch and shifting the pinion on the driving shaft to engage it with the gear on the driven shaft.

3. In a driving unit for speed change gearing, the combination with two shafts on which the speed change gearing is all mounted, of a machine driving pinion loosely mounted on the driven shaft, means for clutching the said pinion to its shaft to be driven thereby, a gear fixed with respect to the driving pinion, a pinion on the driving shaft slidable into and out of mesh with said gear fixed to the driving pinion, change speed gearing between the driven shaft and the gear fixed to the driving pinion adapted to be connected with said pinion on the driving shaft, and means for simultaneously closing the clutch and shifting the pinion on the driving shaft to disengage it.

4. In a driving device for a crank shaping machine, the combination with a driving shaft and a driven shaft constituting the entire shafting of the driving device, of a driving pinion for the machine loosely mounted on the driven shaft, a gear fixed thereto, a clutch connection to the driven shaft, a pinion fixed on the driven shaft, a gear loose on the driving shaft meshing with the last-named pinion constantly, a pinion on the driving shaft shiftable longitudinally into and out of mesh with the gear connected with the machine driving pinion and into and out of connection with the loose gear, and means for operating the clutch and shifting the last-named pinion reversely.

5. In a driving device for a crank shaping machine, the combination with a driving shaft and a driven shaft constituting the entire shafting of the driving device, change speed gears mounted on said shafts, a driving pinion for the machine, and a gear fixed thereto loosely mounted on the driven shaft and having a clutch connection thereto, of a pinion fixed on the driven shaft, a sleeve rotatable on the driving shaft, a gear on said sleeve meshing with the last-named pinion constantly, a pinion on the driving shaft shiftable longitudinally into and out of mesh with the gear connected with the machine driving pinion, and adapted to be driven by the gear on the sleeve, and means for operating the clutch and shifting the last-named pinion simultaneously.

6. In a driving device for a crank shaping machine, the combination with two shafts and change speed gearing thereon, of a sleeve on the driving shaft, a gear fixed on the sleeve and having a gear clutch, a pinion slidable on the sleeve, a pinion fixed on the driven shaft meshing with said gear, a gear and bull pinion fixed together and rotatable on the driven shaft, means for clutching the bull pinion to its shaft, and means for sliding the first named pinion into mesh with the gear fixed to the bull pinion and into mesh with the gear clutch.

In testimony whereof I have hereunto affixed my signature.

GEORGE H. KNIGHT.